United States Patent
Pfeifer

(10) Patent No.: US 11,670,929 B2
(45) Date of Patent: Jun. 6, 2023

(54) HEAT DISSIPATION AND SEALING CONFIGURATION FOR JUNCTION ASSEMBLY

(71) Applicant: Schaeffler Technologies AG & Co. KG, Herzogenaurach (DE)

(72) Inventor: Jacob Pfeifer, Canal Fulton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 17/337,160

(22) Filed: Jun. 2, 2021

(65) Prior Publication Data

US 2022/0393453 A1 Dec. 8, 2022

(51) Int. Cl.
*H02G 5/10* (2006.01)
*H02G 5/08* (2006.01)

(52) U.S. Cl.
CPC .............. *H02G 5/10* (2013.01); *H02G 5/08* (2013.01)

(58) Field of Classification Search
None
See application file for complete search history.

(56) References Cited

U.S. PATENT DOCUMENTS

| | | | |
|---|---|---|---|
| 5,784,257 A * | 7/1998 | Tata | H01L 23/4006 257/713 |
| 2006/0138452 A1* | 6/2006 | Knapp | H01L 25/072 257/E23.101 |
| 2007/0165376 A1* | 7/2007 | Bones | H01L 25/162 257/E25.031 |
| 2008/0009154 A1* | 1/2008 | Kanou | B60R 16/0239 439/76.2 |
| 2013/0120915 A1 | 5/2013 | Eichner et al. | |
| 2017/0079129 A1* | 3/2017 | Chin | H05K 1/181 |
| 2018/0228047 A1* | 8/2018 | Ota | H05K 7/1432 |

FOREIGN PATENT DOCUMENTS

KR 1020120074659 A 7/2012

* cited by examiner

*Primary Examiner* — Hoa C Nguyen
*Assistant Examiner* — John B Freal
(74) *Attorney, Agent, or Firm* — Volpe Koenig, P.C.

(57) ABSTRACT

A junction assembly is disclosed herein. The junction assembly includes a junction housing configured to support a phase bar assembly. A heatsink contacts at least a portion of the junction housing and a busbar is arranged adjacent to the junction housing. At least one fastener attaches the junction housing, the heatsink, and the busbar to each other. At least one heatsink seal is provided at an interface defined between the heatsink and the junction housing.

20 Claims, 5 Drawing Sheets

HEAT DISSIPATION AND SEALING CONFIGURATION FOR JUNCTION ASSEMBLY

FIELD OF INVENTION

The present disclosure relates to a heat dissipation arrangement for a junction box assembly.

BACKGROUND

Junction box assemblies are generally well known in electric motor (e-motor) applications. The junction box assembly is generally configured to transfer power from the power electronics unit (PEU) to the e-motor. Due to the sensitive nature of the electrical components, it is critical to maintain a specific sealing configuration (i.e. Ingress Protection (IP) of 69K) between all relevant assemblies and interfaces. There are various known techniques and configurations for achieving this specific seal requirement.

Heat dissipation is also a concern with junction box assemblies. In one aspect, heat dissipation is mainly addressed via a forced fluid circuit that is arranged around the thermal producing components in order to remove heat. These arrangements require additional sealing configurations, pumps, filters, and other components. All of these features increase the cost and complexity of the assemblies. Additionally, performance of fluid-based heat dissipators reduces over time due to wear, contamination, and other factors.

Accordingly, there is a general desire to provide an improved assembly that both achieves a requisite sealing function and also provides heat dissipation.

SUMMARY

The present disclosure provides an improved passive heat dissipation configuration for a junction assembly that also provides the requisite sealing characteristics.

In one aspect a junction housing is provided that is configured to support a phase bar assembly. A heatsink contacts at least a portion of the junction housing and a busbar is arranged adjacent to the junction housing. At least one fastener attaches the junction housing, the heatsink, and the busbar to each other. At least one heatsink seal is provided at an interface defined between the heatsink and the junction housing.

In one aspect, the junction housing includes a first junction housing and a second junction housing, and a junction housing seal is arranged between the first junction housing and the second junction housing.

At least one blind clinch nut can be arranged in the busbar, such as via being molded with the busbar, and the at least one blind clinch nut is configured to engage the at least one fastener. The at least one blind clinch nut can include two blind clinch nuts, and the two blind clinch nuts can be arranged between a respective pair of phase leads in the busbar.

At least one busbar seal can be arranged in an interface defined between the busbar and the junction housing.

To further address thermal and electrical protection, a dielectric coating can be arranged at an interface between the heatsink and at least a portion of a phase bar assembly arranged within the junction housing.

The heatsink can include at least one recess dimensioned to receive the at least one fastener, such that the at least one fastener is positioned below a top surface of the heatsink in an installed state.

The junction assembly has a sealing rating of IP69K, according to one aspect.

A method of providing heat dissipation for a junction assembly is also disclosed herein. The method includes arranging a heatsink in contact with at least a portion of a junction housing that supports a phase bar assembly. The method includes providing at least one heatsink seal at an interface between the heatsink and the junction housing, and applying a dielectric coating to at least a portion of the interface between the heatsink and the phase bar assembly. The method can further include fastening the heatsink to the junction housing and to a busbar using at least one fastener and at least one nut.

Additional embodiments described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
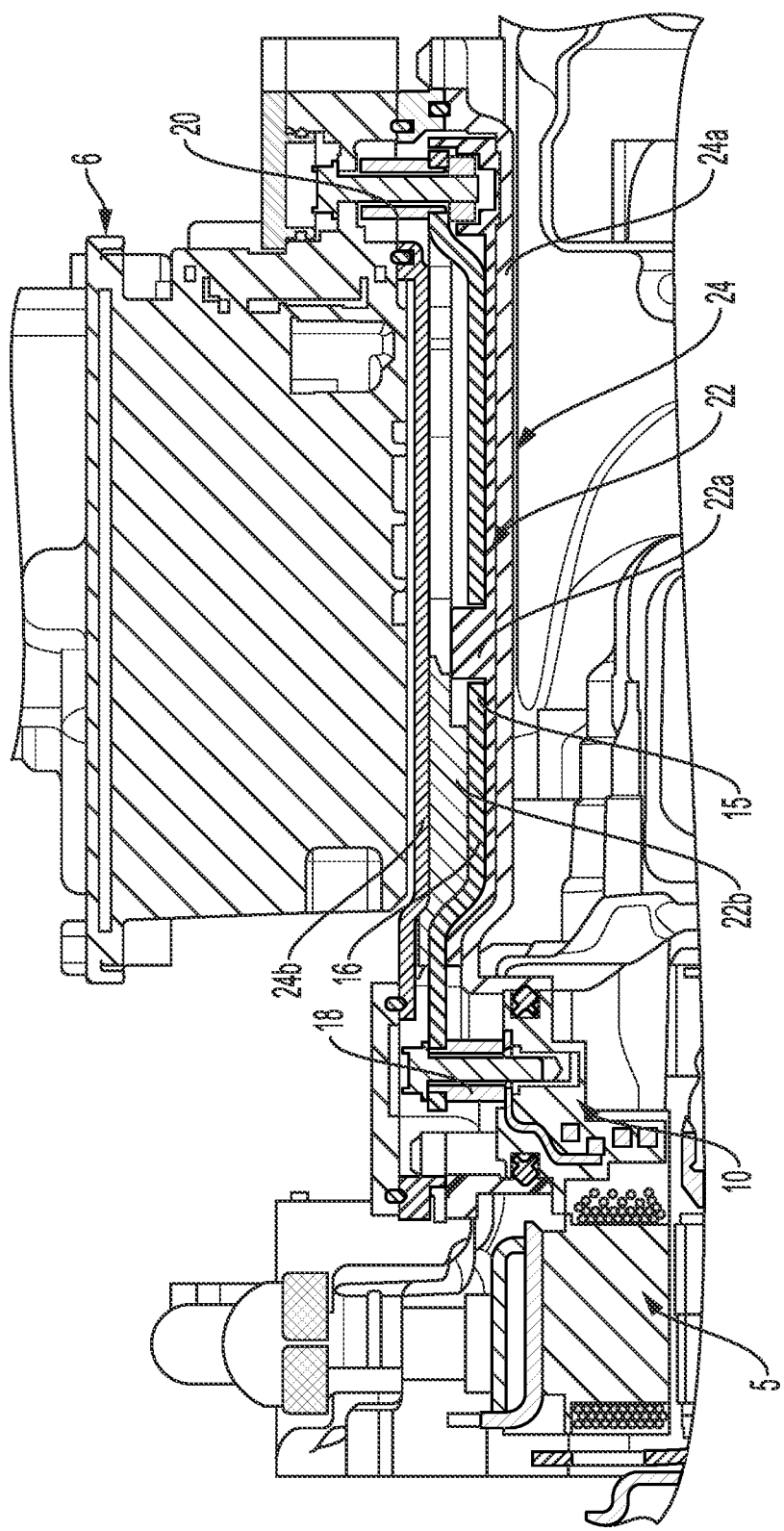
FIG. 1 is a cross-sectional view of an assembly including a PEU and an e-motor.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Referring to FIG. 1, an assembly is disclosed that includes an e-motor 5 and a PEU 6. As shown in FIG. 1, a junction box assembly 10 is also disclosed. In one aspect, the junction box assembly 10 includes a plurality of phase bar assemblies 15. As shown in FIG. 1, only one of the phase bar assemblies 15 is visible. In one aspect, each phase bar assembly 15 includes a main phase bar body 16 that generally extends between the e-motor 5 and the PEU 6.

Figure 2:
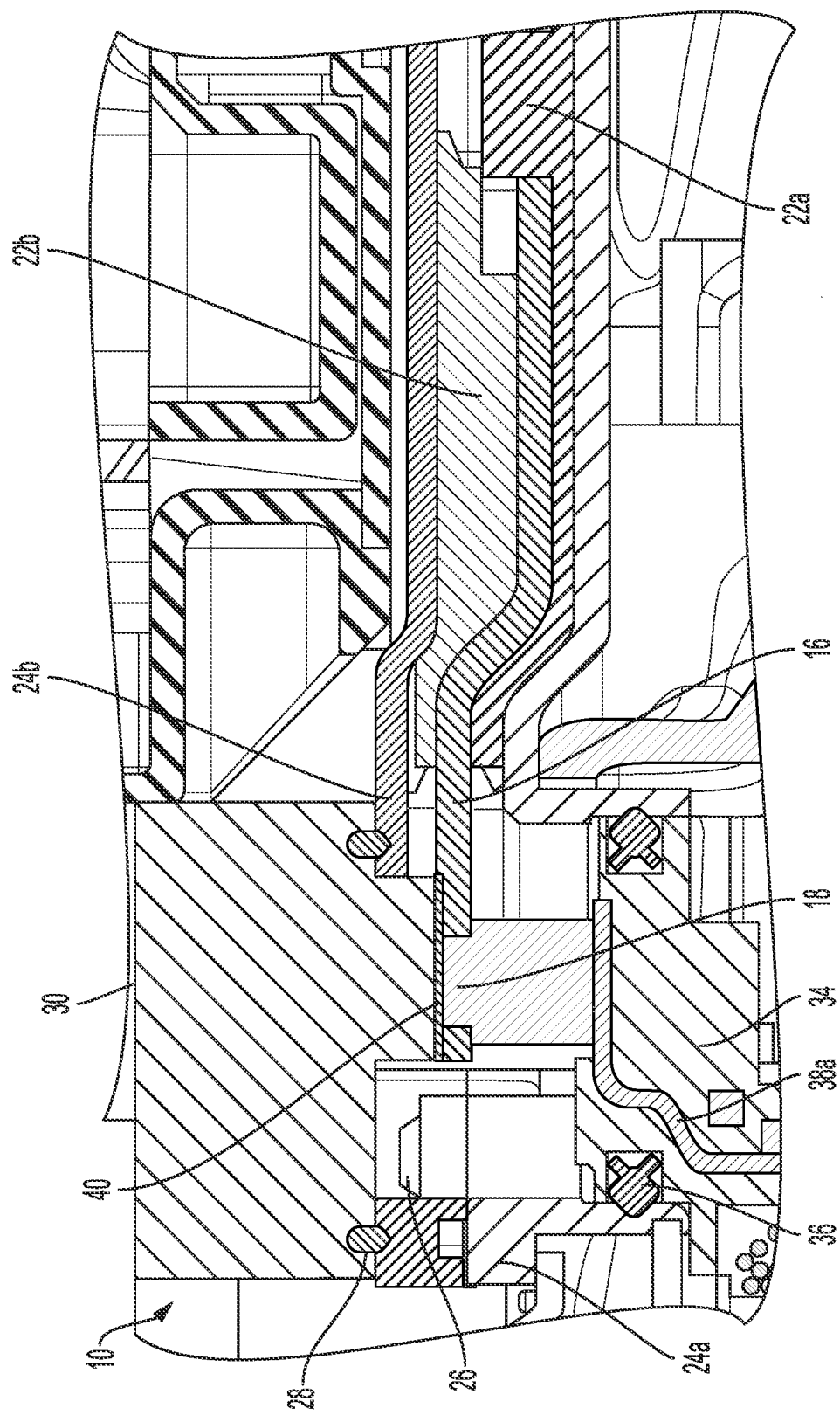
FIG. 2 is a cross-sectional view showing a junction box assembly according to one aspect.

In one aspect, a first spacer 18 is provided on the side with the e-motor 5, and a second spacer 20 is provided on the side with the PEU 6. The spacers 18, 20 can be formed from a conductive metal, such as copper. The spacers 18, 20 can provide improved electrical connections, and may also be used to improve the ability to access, assemble, remove, and re-assemble components of the junction box assembly 10. As shown in FIG. 2, the spacer 18 extends between the main phase bar body 16 and at least one phase lead 38a. A gap, such as in a vertical direction, provided by the spacers 18, 20 allows for an improved design of the main phase bar body 16. The spacer 18 also allows for equal surface contact around the surface interface of the phase lead 38a.

A retainer 22 is generally provided to secure the phase bar assembly 15. As shown in FIG. 1, the retainer 22 may include a first or lower retainer body 22a and a second or upper retainer body 22b. Securing elements, such as dowels or other fasteners, can be used to secure the first retainer body 22a to the second retainer body 22b.

A junction housing 24 is also provided that generally surrounds the retainer 22. The junction housing 24 can include a first or lower junction housing 24a, and a second or upper junction housing 24b. In one aspect the first retainer body 22a, the second retainer body 22b, the first junction housing 24a, and the second junction housing 24b are all fixed to each other.

Figure 4:
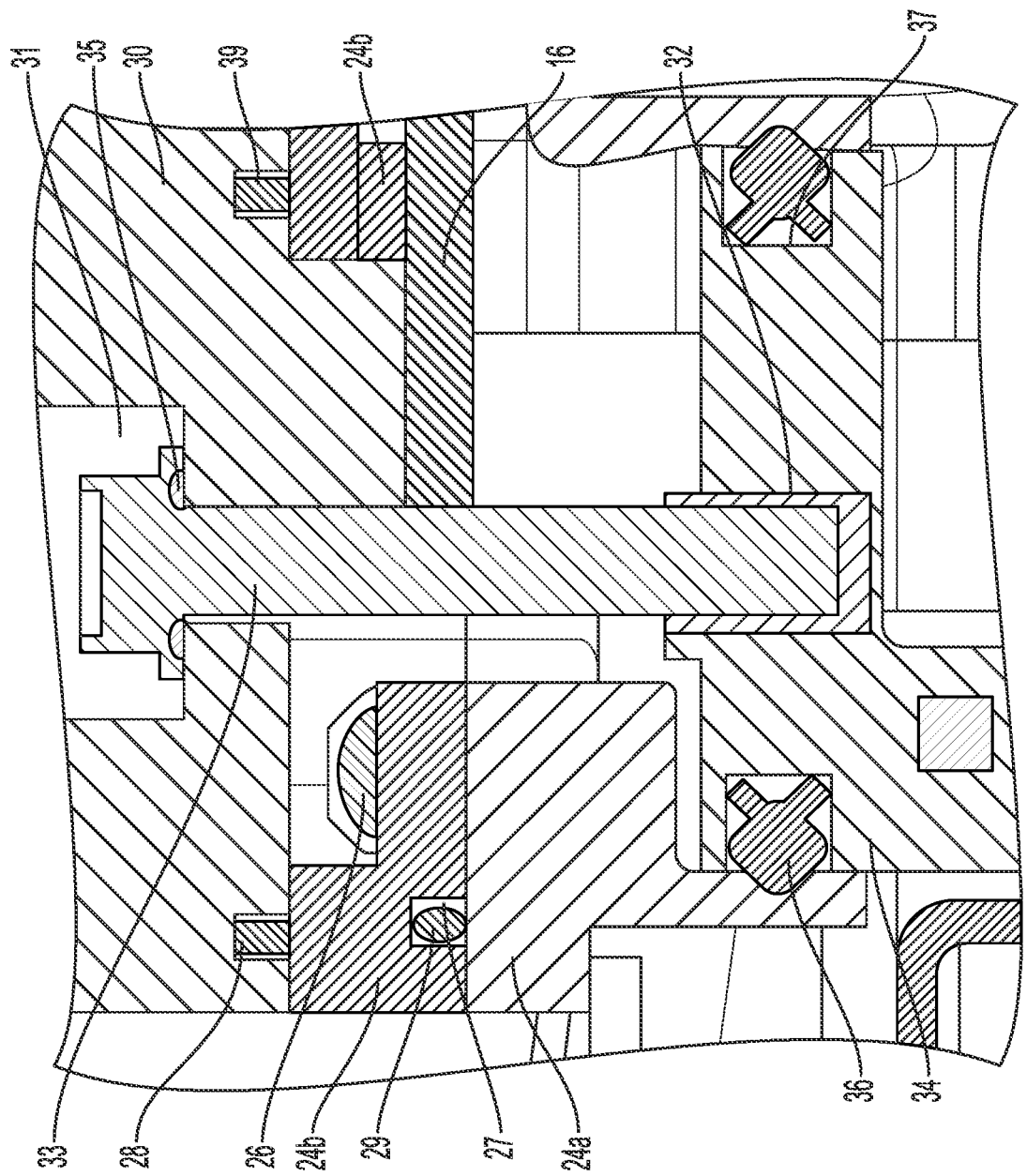
FIG. 4 is another cross-sectional view showing an interface between a heatsink, junction housing, and busbar.

A plurality of fasteners 26 extend between the first junction housing 24a and the second junction housing 24b, in one aspect. The fasteners 26 can be bolts, in one embodiment. The plurality of bolts 26 can include at least nine bolts that connect or secure the first junction housing 24a with the second junction housing 24b. The bolts 26 provide force to compress a junction housing seal 29 provided on peripheral areas on the interface between the first and second junction housing 24a, 24b, as shown in FIG. 4. In one aspect, a groove 27 is formed on an underside of the junction housing 24b that is dimensioned to receive the junction housing seal 29.

Fastening elements 32, 33 can be provided to secure a heatsink 30 to a busbar 34. In one aspect, the busbar 34 is an e-motor busbar ring. In one aspect, the fastening elements comprise nuts 32 and bolts 33 that are configured to mate with the nuts 32. In one aspect, the nuts 32 are blind clinch nuts. As shown in FIG. 4, the bolts 33 extend completely through the junction housing 24a, 24b such that the bolts extend completely through opposing end faces of the junction housing 24a, 24b. In one aspect, the fastening elements 32, 33 include exactly two bolts 33 and exactly two nuts 32.

Figure 3:
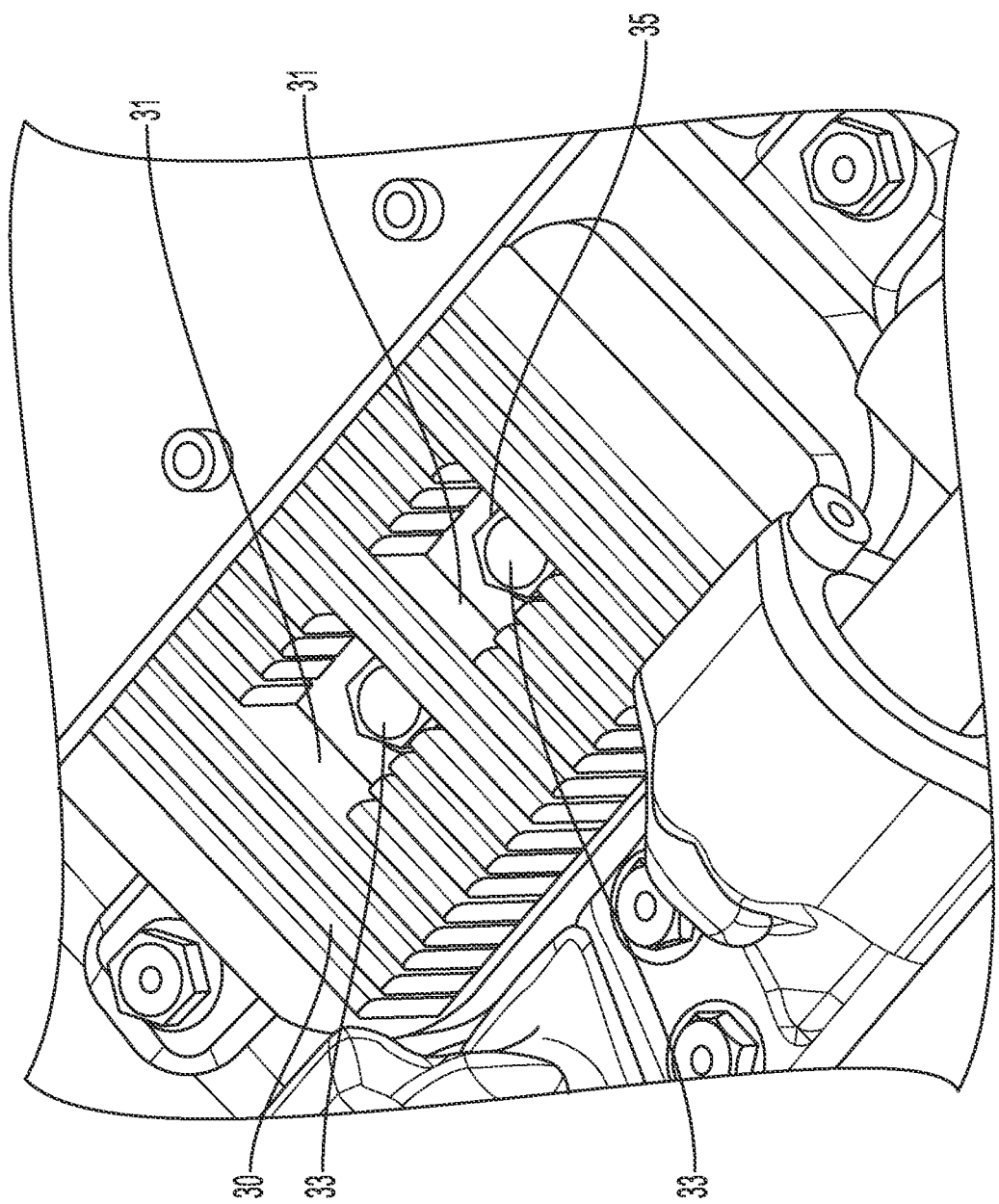
FIG. 3 is a top perspective view of a heatsink from FIG. 2.

The heatsink 30, as best shown in FIG. 3, has a generally rectangular profile, in one aspect. As shown in FIG. 2, a height of the heatsink 30 is greater than a height of the junction housing 24a, 24b in one aspect. The assembly disclosed herein relies completely on the heatsink 30 for heat dissipation, and does not require any cooling fluid, in one aspect.

The two blind clinch nuts 32 can be assembled with or overmolded into busbar 34, which can be formed from plastic. Seals 35, such as O-ring seals, can be provided for ensuring secure connection between the bolts 33 and the heatsink 30. In one aspect, recesses 31 are formed in the heatsink 30 that are dimensioned to receive at least a portion of the bolts 33. As shown in FIG. 4, this arrangement allows the bolts 33 to sit completely recessed within the heatsink 30 once fully installed.

A heatsink seal 28 can be provided at an interface between the second junction housing 24b and the heatsink 30. Securing the bolts 33 with the blind clinch nuts 32 can compress the heatsink seal 28, and further ensure the sealing function of heatsink seal 28.

A busbar seal 36 can also be provided around the busbar 34 that provides a sealing interface between the busbar 34 and the first junction housing 24a. The busbar seal 36 can be arranged in a groove 37 formed in the busbar 34. Other configurations or retention arrangements for the busbar seal 36 can be provided. As shown in the Figures, three seals 28, 29, 36 contact the junction housing 24a, 24b.

Figure 5:
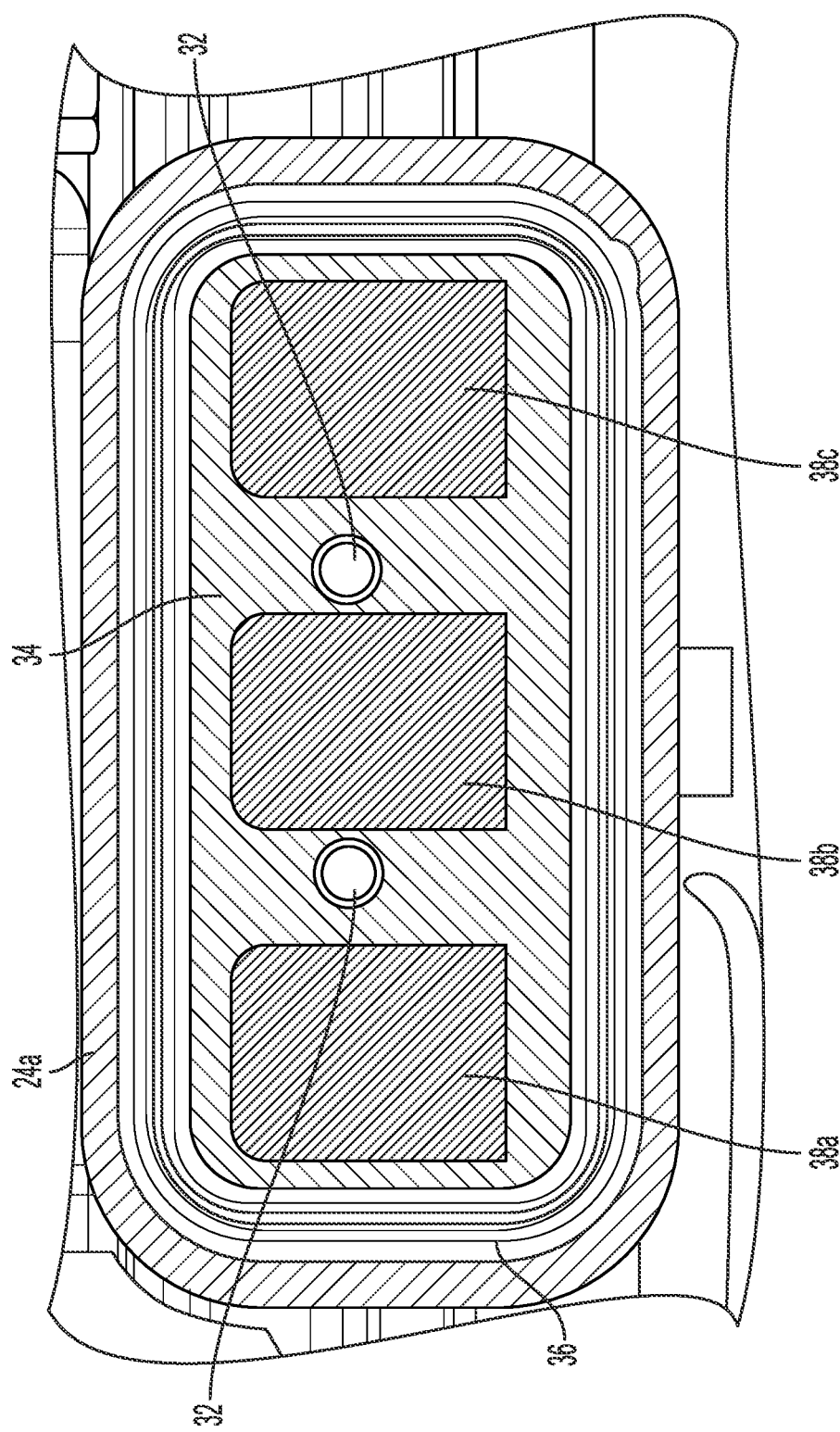
FIG. 5 is a top view of a partially assembled portion of the junction box assembly.

As shown in FIG. 5, a plurality of phase leads 38a, 38b, 38c are provided in the busbar 34. The plurality of phase leads 38a, 38b, 38c can correspond to the U, V, W, phase leads coming from the e-motor 5. The plurality of phase leads 38a, 38b, 38c are generally spaced apart more than known busbar assemblies, which allows for the blind clinch nuts 32 to be arranged between respective pairs of the phase leads 38a, 38b, 38c. This configuration reduces the number of bolted connections, which reduces electrical resistance due to bolted joints not passing directly through the phase leads 38a, 38b, 38c. As shown in FIG. 5, the plurality of phase leads 38a, 38b, 38c lack any holes or interruptions, which may otherwise be required in other arrangements to accommodate the blind clinch nuts 32 or bolts 33.

In one aspect, rifling of the heatsink 30 is provided for contact with the phase bar assemblies 16 in order to provide additional thermal conduction area contact. One of ordinary skill in the art would understand from the present disclosure that heat-dissipating fins, grooves, or other structures can be provided on the heatsink 30 to further improve its heat dissipation capacity.

Attachment of the heatsink 30 to the blind clinch nuts 32 can also be configured to compress the heatsink seal 28, and further improve the overall sealing configuration of the assembly. In one aspect, the heatsink 30 includes a groove 39 dimensioned to receive the heatsink seal 28. In one aspect, the groove 39 is formed on an underside of the heatsink 30.

In one aspect, a dielectric coating 40 is applied to an outer surface of the phase bar assemblies 16 and the first spacer 18 in order to provide additional thermal dissipation capability. The dielectric coating 40 could be adhered to the heatsink 30 through various manufacturing methods. In one aspect, the dielectric coating 40 is scratch resistant, which prevents an unintended leakage path for current running through the phase bar assemblies 16.

As shown in FIG. 2, the dielectric coating 40 can be provided at an interface between the heatsink 30 and the phase bar assembly 16 and first spacer 18. The dielectric coating 40 can provide additional thermal conductive and electrical insulative protection. The dielectric coating 40 can provide an additional thermal path for heat generated in the phase bar assembly 16 via the e-motor leads 38a to transfer to the heatsink 30 while still providing electrical insulation between the phase bar assembly 16. The heatsink 30 contacts the at least one phase bar assembly 16, as shown in FIG. 2.

In one aspect, the heatsink seal 28 is arranged between radial faces of the heatsink 30 and the junction housing 24b. The junction housing seal 29 can also be arranged between radial faces of the first and second junction housings 24a, 24b, in one aspect. The busbar seal 36 can be arranged between axial faces of the junction housing 24a and the busbar 34, in one aspect. One of ordinary skill in the art would understand based on the present disclosure that any one or more of the seals can be rearranged or repositioned, or otherwise modified based on a particular application.

Additionally, in one aspect, the heatsink seal 28 and the junction housing seal 29 are formed as O-rings, gaskets, or other type of rubber seal having a generally oval or circular cross-section. In one aspect, the busbar seal 36 can include at least one sealing body and at least one sealing leg. The exact type and configuration of the seals can vary.

In one aspect, the busbar 34 is compact and therefore the blind clinch nuts 32 and the groove 37 for the busbar seal 36 overlap with each other in a plane that extends in the axial direction.

A method of providing heat dissipation for a junction assembly is also disclosed herein. The method includes arranging a heatsink 30 in contact with at least a portion of a junction housing 24, 24a, 24b that supports a phase bar assembly 15. The method includes providing at least one heatsink seal 28 at an interface between the heatsink 30 and the junction housing 24b, and applying a dielectric coating 40 to at least a portion of the interface between the heatsink 30 and the phase bar assembly 15. In one aspect, the dielectric coating 40 is applied specifically to the interface between the heatsink 30 and the main phase bar body 16 and spacer 18 within the junction housing. Additional steps for the method can include any one or more of the features disclosed herein.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS e-motor 5
PEU 6
junction assembly 10
phase bar assembly 15
main phase bar body 16
e-motor side spacer 18
PEU side spacer 20
retainer 22, 22a, 22b
junction housing 24, 24a, 24b
fasteners 26
junction housing groove 27
heatsink seal 28
junction housing seal 29
heatsink 30
recesses 31
blind clinch nuts 32
bolts 33
busbar 34
O-ring seals 35
busbar seal 36
busbar groove 37
plurality of phase leads 38a, 38b, 38c
groove 39
dielectric coating 40

The invention claimed is:

1. A junction assembly comprising:
   a junction housing configured to support a phase bar assembly;
   a heatsink contacting at least a portion of the junction housing;
   a busbar arranged adjacent to the junction housing;
   at least one fastener attaching the junction housing, the heatsink, and the busbar to each other; and
   at least one heatsink seal provided at an interface defined between the heatsink and the junction housing.

2. The junction assembly according to claim 1, wherein the junction housing includes a first junction housing and a second junction housing, and a junction housing seal is arranged between the first junction housing and the second junction housing.

3. The junction assembly according to claim 1, further comprising at least one blind clinch nut is arranged in the busbar, and the at least one blind clinch nut is configured to engage the at least one fastener.

4. The junction assembly according to claim 3, wherein the at least one blind clinch nut includes two blind clinch nuts, and the two blind clinch nuts are arranged between a respective pair of phase leads in the busbar.

5. The junction assembly according to claim 4, wherein the two blind clinch nuts are molded with the busbar.

6. The junction assembly according to claim 1, further comprising at least one busbar seal arranged in an interface defined between the busbar and the junction housing.

7. The junction assembly according to claim 1, further comprising a dielectric coating arranged at an interface between the heatsink and at least a portion of a phase bar assembly arranged within the junction housing.

8. The junction assembly according to claim 1, further comprising an O-ring seal arranged at an interface defined around a periphery of the at least one fastener and the heatsink.

9. The junction assembly according to claim 1, wherein the heatsink includes at least one recess dimensioned to receive the at least one fastener, such that the at least one fastener is positioned below a top surface of the heatsink in an installed state.

10. The junction assembly according to claim 1, wherein the at least one fastener extends between opposing end faces of the junction housing.

11. The junction assembly according to claim 1, wherein a bottom surface of the heatsink contacts at least one main phase bar body arranged inside of the junction housing.

12. The junction assembly according to claim 1, wherein the junction assembly has a sealing rating of IP69K.

13. The junction assembly according to claim 1, wherein the at least one fastener consists of two fasteners.

14. A junction assembly comprising:
   a junction housing configured to support a phase bar assembly, the junction housing including a first junction housing and a second junction housing with a junction housing seal arranged therebetween;
   a heatsink arranged directly in contact with a first side of the junction housing, and at least one heatsink seal arranged in contact with the heatsink and the junction housing;
   a busbar arranged directly in contact with a second side of the junction housing, and at least one busbar seal arranged between the busbar and the junction housing; and
   at least one nut molded with the busbar and at least one fastener configured to matingly engage with the at least one nut, the at least one fastener being configured to attach the junction housing, the heatsink, and the busbar to each other.

15. The junction assembly according to claim 14, further comprising a dielectric coating arranged at an interface between the heatsink and at least a portion of a phase bar assembly arranged within the junction housing.

16. A method of providing heat dissipation for a junction assembly, the method comprising:

arranging a heatsink in contact with at least a portion of a junction housing that supports a phase bar assembly;

providing at least one heatsink seal at an interface between the heatsink and the junction housing;

applying a dielectric coating to at least a portion of the interface between the heatsink and the phase bar assembly;

fastening the heatsink to the junction housing and to a busbar using at least one fastener and at least one nut.

17. The method according to claim 16, wherein the at least one nut is a blind clinch nut that is molded with the busbar.

18. The method according to claim 17, wherein the at least one nut is arranged between two phase leads in the busbar.

19. The method according to claim 16, wherein the junction housing includes a first junction housing and a second junction housing, the method further comprising arranging at least one junction housing seal between the first junction housing and the second junction housing.

20. The junction assembly according to claim 1, wherein the at least one fastener extends completely through the junction housing.

\* \* \* \* \*